US005367295A

United States Patent [19]

Gokcebay et al.

[11] Patent Number: 5,367,295

[45] Date of Patent: Nov. 22, 1994

[54] CONVENTIONAL MECHANICAL LOCK CYLINDERS AND KEYS WITH ELECTRONIC ACCESS CONTROL FEATURE

[75] Inventors: Asil T. Gokcebay, San Francisco; Yucel K. Keskin, Cupertino, both of Calif.

[73] Assignee: Security People, Inc., San Francisco, Calif.

[21] Appl. No.: 836,206

[22] Filed: Feb. 14, 1992

[51] Int. Cl.$^5$ .......................... G06K 9/78; G06K 9/62

[52] U.S. Cl. .............................. 340/825.31; 235/382; 235/492

[58] Field of Search ...................... 340/825.31, 825.32, 340/825.34, 542, 543; 70/277, 279, 264, 395, 408, 278; 235/382, 382.5, 492; 307/10.3, 10.4, 10.5; 361/171, 172

[56] References Cited

U.S. PATENT DOCUMENTS

| | | | |
|---|---|---|---|
| 4,686,358 | 8/1987 | Seckinger et al. | 235/492 |
| 4,835,407 | 5/1989 | Kataoka et al. | 70/278 |
| 4,858,453 | 8/1989 | Namazue | 70/408 |
| 4,922,736 | 5/1990 | Tanaka et al. | 70/277 |
| 4,947,662 | 8/1990 | Imedio | 70/395 |
| 4,998,952 | 3/1991 | Hyatt, Jr. et al. | 70/395 |
| 5,003,801 | 4/1991 | Stinar et al. | 70/408 |
| 5,019,812 | 5/1991 | Gostahagberg et al. | 340/542 |
| 5,131,038 | 7/1992 | Puhl et al. | 340/825.34 |
| 5,140,317 | 8/1992 | Hyatt, Jr. et al. . | |

FOREIGN PATENT DOCUMENTS 3615207 11/1987 Germany .

*Primary Examiner*—Donald J. Yusko
*Assistant Examiner*—John Giust
*Attorney, Agent, or Firm*—Thomas M. Freiburger

[57] ABSTRACT

A mechanical key and lock cylinder with mechanical bittings include an electronic access control feature, with minimal modification and without affecting or interfering with the mechanical function of the key and cylinder. A small, low-profile memory cell is embedded in a recess or lateral hole through the key, with one cell terminal grounded to the key and the other having a contact extension. When the key is inserted into the keyway of the cylinder plug, the ground connection is made with the cylinder and the memory cell contact extension engages a spring-loaded contact of a connector unit which extends from the cylinder plug. An insulated wire carries the conductive path out of the lock cylinder. The key remains of very low profile, and the cylinder plug is modified only by a small longitudinal bore from front to rear. Existing mechanical locks and cylinders can easily be retrofitted with the electronic access control feature.

10 Claims, 7 Drawing Sheets

CONVENTIONAL MECHANICAL LOCK CYLINDERS AND KEYS WITH ELECTRONIC ACCESS CONTROL FEATURE

BACKGROUND OF THE INVENTION

This invention relates to the use of existing mechanical locks with mechanical tumbler types of cylinders for electronic access control.

A number of access control systems have existed incorporating electrically operated locking devices with decision-making electronics for permitting access housed within the lock's trim, such as Touchcode system manufactured by Yale Electronics of Charlotte, N.C., Nova System manufactured by Kaba of Southington, Conn., and Solitaire System manufactured by Marlock of Chicago, Ill. Some of these access lock systems employ keypads, some cards, some purely electronic, magnetic or optic keys, and some employ mechanical keys equipped with electronic circuitry.

For the benefit of the current invention, distinction must be made between the purely electronic, magnetic or optical keys, mechanical keys, and mechanical keys equipped with electronic, magnetic or optical features.

A key comprised of purely electronic circuitry, magnetic or optical data storage and identification for access is an electronic key. In their use, the circuitry or recorded data is transferred to the reader means or reader recognizes the pattern held by the key optically. This key does not carry any mechanical cut configuration which is critical for granting access. These types of keys can be found in U.S. Pat. Nos. 3,797,936, Dimitriadis, granted Mar. 19, 1974; 4,209,782, Donath et al., granted Jun. 24, 1980; 4,257,030, Bruhin et al., granted Mar. 17, 1981; 4,620,088, Flies, granted Oct. 20, 1986; 4,659,915, Flies, granted Apr. 21, 1987; 4,789,859, Clarkson et al., granted Dec. 6, 1988.

Mechanical keys are keys which activate a mechanical device through direct contact with the interpreting device, the tumblers. Based on the depth and placement configuration of the cut's meeting the tumblers and creating the proper alignment of such tumblers, access is granted. In most cases, once the proper alignment is established, the keyholder is able to turn the key to lock and unlock the locking device. However, in some cases, a push or pull action may be necessary for the locking and unlocking of the locking device. The aforementioned tumblers can be pin tumblers, lever tumblers, disk tumblers, rotary disk tumblers, or slider tumblers. Examples of mechanical keys may be found in U.S. Pat. Nos. 480,299, H. G. Voight, granted Aug. 9, 1892; 550,111, H. B. Sargent, granted Nov. 19, 1895; 564,029, H. B. Sargent, granted Jul. 14, 1896; 3,208,248, Tornoe, granted Feb. 6, 1963; 4,723,427, Oliver, granted Feb. 9, 1988; 4,732,022, Oliver, granted Mar. 22, 1988; 4,823,575, Florian et al., granted Apr. 25, 1989.

A mechanical key equipped with electronic circuitry, magnetic or optical data storage or optically recognizable features can be found in U.S. Pat. Nos. 3,733,862, Killmeyer, granted May 22, 1973; 4,144,523, Kaplit, granted Mar. 13, 1979; 4,326,124, Faude, granted Apr. 20, 1982; 4,562,712, Wolter, granted Jan. 7, 1986; 4,663,952, Gelhard, granted May 12, 1987; and 4,686,358, Seckinger et al., granted Aug. 11, 1987. These keys carry the secondary element whether it is an electronic circuitry or some other type of coded data or recognizable pattern, in addition to its mechanically operating feature as described in purely mechanical keys. In some instances, both mechanical and non-mechanical features of the key are used simultaneously for granting access and in some cases, these features are used independently.

The current invention relates to the conversion of mechanical lock cylinders and keys for electronic use without altering their mechanical functionality, as well as to a simple cylinder and a key fitted with electronic components. As mentioned above, keys and cylinders employing other electronic or other non-mechanical features, as well as mechanical features, exist. In these existing types of systems, a keyholder will insert his/her key carrying electronic circuitry with contact means into the key receiving cylinder employing a matching contact means and, upon this insertion and turning, a contact will be made with the reader unit transferring the access information into the lock's decision making unit. This decision making unit is usually housed within the lock's trim plate. Upon the decision to grant access, the unit will electrically unlock the locking mechanism or allow the key to turn and retract the latch bolt of the lock.

These systems employ complicated and expensive circuitry and contact means, thus requiring special manufacturing of both cylinder and key.

The objective of the current invention is to provide a simple method of conversion that applies to any mechanical key and cylinder combination for their use in electronic access control systems.

A simplified approach is taken to the reader and the key connection by the present invention described below. In a preferred embodiment, the existing lock cylinders and keys are simply modified (or the same type of lock and key are OEM fitted) to become a part of an electronic access control lock while still maintaining their mechanically operating status.

SUMMARY OF THE INVENTION

THE KEY

The mechanical key is fitted with a memory cell employing one wire bus communication protocol such as ones made by Dallas Semiconductor models DS1990, DS1991, DS1992, DS1993 and DS1994, having a conductive metal casing with an isolated data terminal. These cells are fitted into the key's head area by opening a hole on the key's head the same size as the cell's diameter for a tight fit contact. In another preferred embodiment, the hole for the memory cell may not be drilled all the way through, leaving metal at the bottom of the cavity for better contact. Due to the small size of the cell, there is adequate space in the key's head for its normal mechanical functions and other capabilities, i.e. shoulder stops, key-ring hole, etc. No other modification to the existing key is necessary, with the exception of the cavity hole. Preferably a plastic cover is included over the key's head.

By inserting the memory cell into the key, the ground contact between the cell and the key is established. The data communication is provided by a small metal probe or contact extension contacting the other terminal or data end of the cell and extending toward the key cut, most of it covered by the outside plastic cover. While one end of this probe is making contact with the data end of the cell, the other end lies generally flush with the key shoulder (which limits movement of the key into the lock cylinder). The probe is within the outside cover but in such a way that upon insertion of the key into the key plug it will come in contact with the connector located on the cylinder plug.

THE CONNECTOR UNIT

The connector unit consists of a spring-loaded contact, preferably 22 gauge ordinary electrical wire and heat shrink tubing. The spring-loaded contact is the type that is commonly used in the testing of electronic circuitry like those made by Interconnect Devices, Inc. The outside diameter of this contact is about 0.054". The heat shrink tubing is also commonly used and available for insulation purposes. In the preferred embodiment, the wire is soldered to the back end of the contact, then they are both inserted into the heat shrink tubing leaving a small portion of the contact exposed. In another preferred embodiment, a female connector may be soldered to the back end of the contact to facilitate hook-up to the circuitry. The unit is then heated and the heat shrink tube insulates the contact and the wire creating the connector unit. The unit is now ready to be inserted into the cylinder plug.

THE CYLINDER PLUG

In accordance with one preferred embodiment of the present invention, a small hole is drilled along the length of the cylinder plug at the side of its key way, without interfering with its mechanically operating pins, wafers, disks, side-bars or sliders, etc. The connector unit is then inserted and secured into the above mentioned hole. The spring loaded tip of the connector unit extends from the plug surface approximately 0.015" to establish contact with the key's probe. The other end of the connector unit carrying communication from the key is sent to a processor board for processing of the data. The body of the plug, cylinder and lock body thereof, serves as the ground part of the communication. This comprises a single-wire bus communication protocol.

In another preferred embodiment, the lock cylinder may be of a high security type, such as ones manufactured by Medeco Security Locks, Assa, Schlage Primus line, etc. High security lock cylinders generally employ secondary locking principles to achieve further security. The employment of these principles does not interfere with the present invention nor the present invention interfere with the above mentioned additional locking principles, making the method applicable to virtually any type of mechanical locking cylinder available in the marketplace today. There is also no interference with the cylinder's cam unit, allowing normal mechanical functionality.

Upon insertion of the key into the cylinder plug, the probe makes contact with the connector unit located on the plug and transmits the data. These cell units are available with pre-programmed memory carrying identification number data, as well as read and write memory, allowing many applications, such as cells carrying data about the keyholder such as name, PIN number, access code, biometric template (e.g. fingerprint, retina scan, voice print), etc. The memory cell preferably is password protected, so that only authorized persons can have access to the data contained in the memory cell.

No special key blank, lock cylinder or plug manufacturing is necessary in the present invention, which uses keys and cylinders manufactured by all major lock manufacturers, i.e. Schlage, Yale, Corbin, Russwin, Arrow, Assa, Sargent, Medeco, Falcon, etc.

When the key is used for access control purposes, preferably it will not have the mechanical configurations necessary to operate the lock cylinder in which it is being inserted. It will, however, be able to operate other locks within the facility where access control or high security is not required, and the keyholder is allowed to enter by using the mechanical feature of his/her key. The locks that are fitted with the access control system will still have the mechanical by-pass capability. These locks may, for example, be keyed to the grand master key. This feature can be handy if the electronics of the lock fail.

Since the key contains both a memory cell containing access control data and mechanical bittings, it can be used for accessing both high and low security areas. The mechanical bittings will allow the user to access areas where time and date control for access is not required, thus making it a low security area, and the electronically stores access control data can be used in locks (areas) employing time and date control, thus making it a high security area.

The above aspects relative to higher and lower security points and biometric featured encoded on the key are similar in some respects to the system disclosed in co-pending application Ser. No. 343,663, filed Apr. 27, 1989 and the disclosure of that application is incorporated herein by reference.

DESCRIPTION OF PREFERRED EMBODIMENTS

Figure 1:
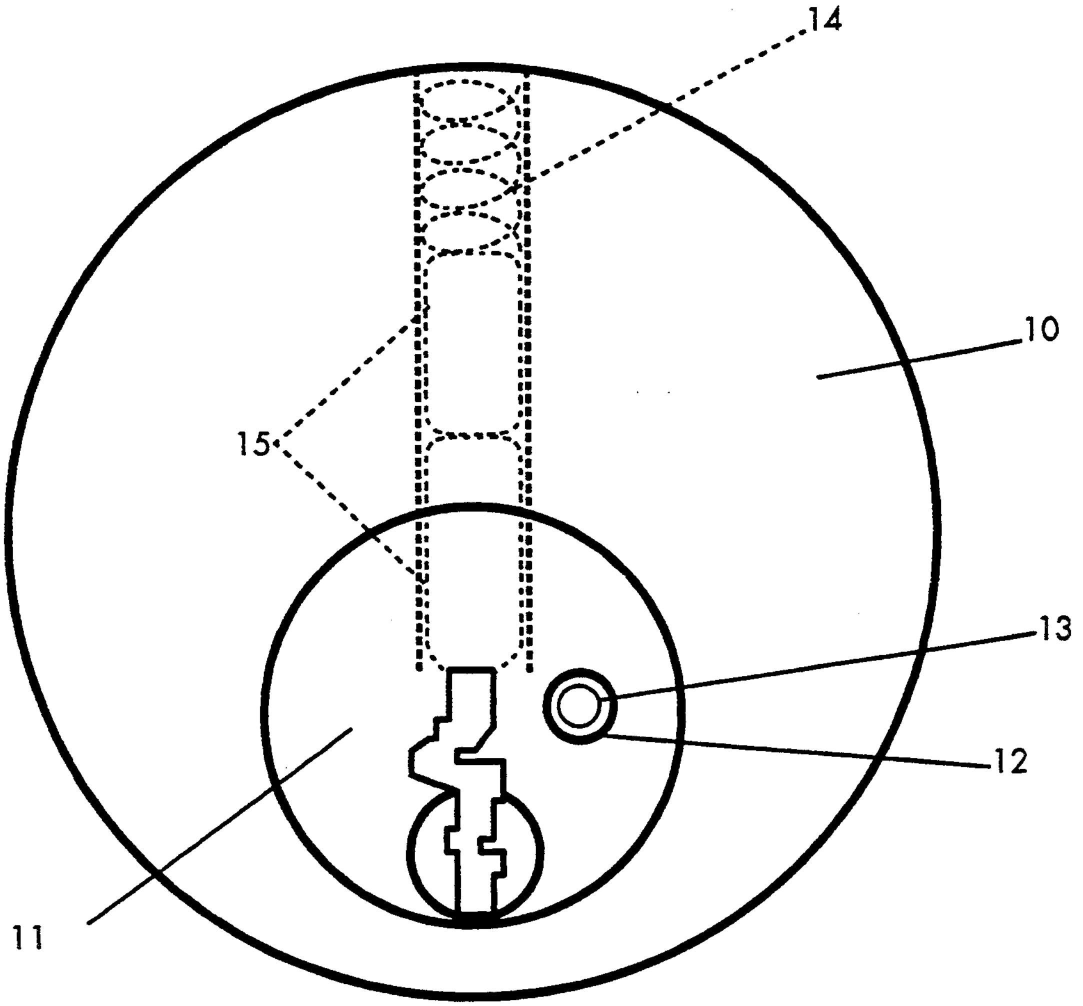
FIG. 1 shows a front view of a mechanical mortise cylinder fitted with the conversion means.

In the drawings, FIG. 1 shows the front view of a mortise type cylinder 10. The cylinder plug 11 contains a hole 12 on the side of its keyway in such distance from the keyway where it does not interfere with the pinholes 14 and pins 15 working inside the pinholes 14. A connector unit is in the hole 12, electrically insulated from the metal of the plug.

Figure 2:
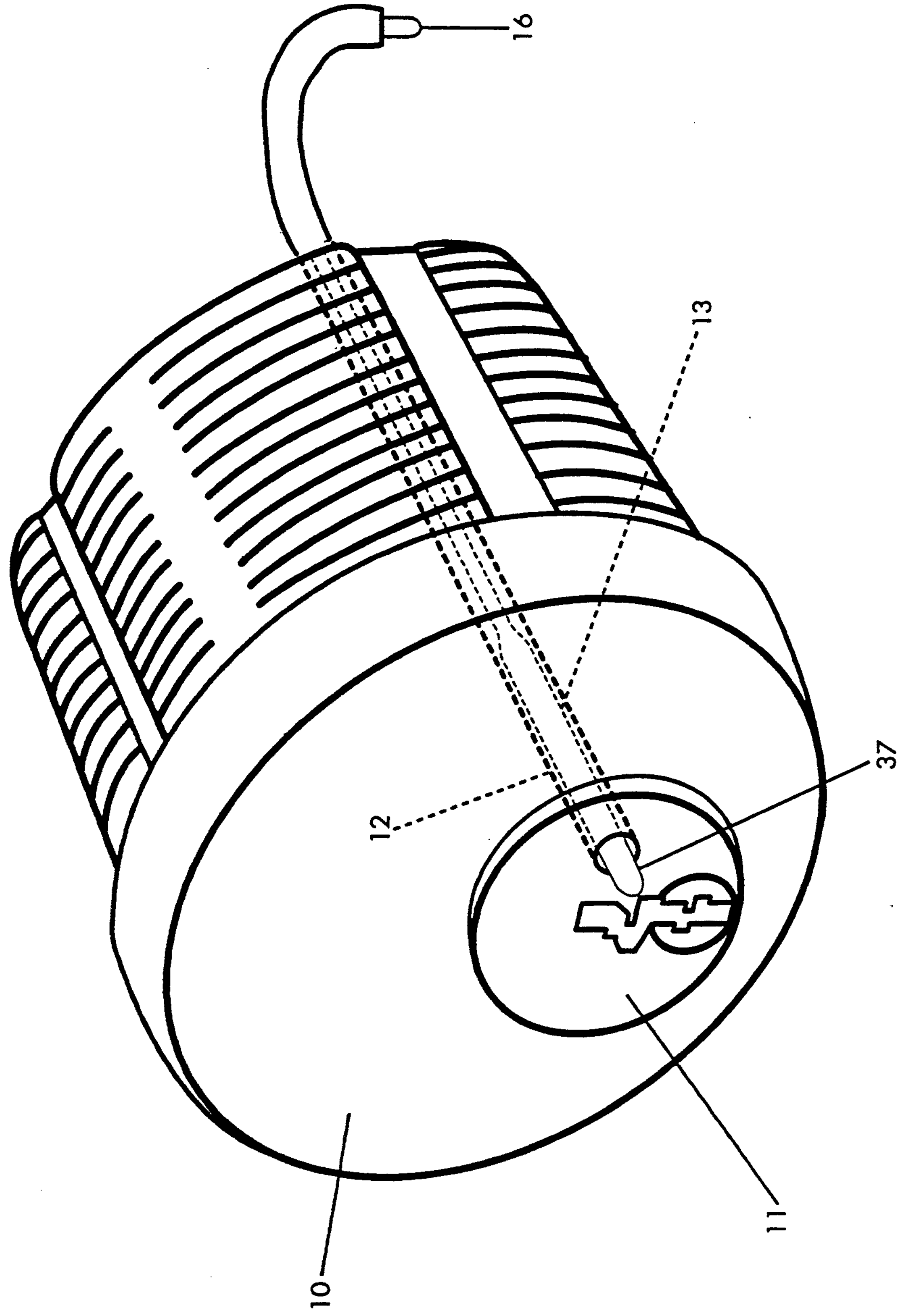
FIG. 2 is a perspective view of the same cylinder.

FIG. 2 shows the same cylinder in perspective, including the connector hole 12 inside the cylinder plug, and the connector unit 13.

Figure 3:
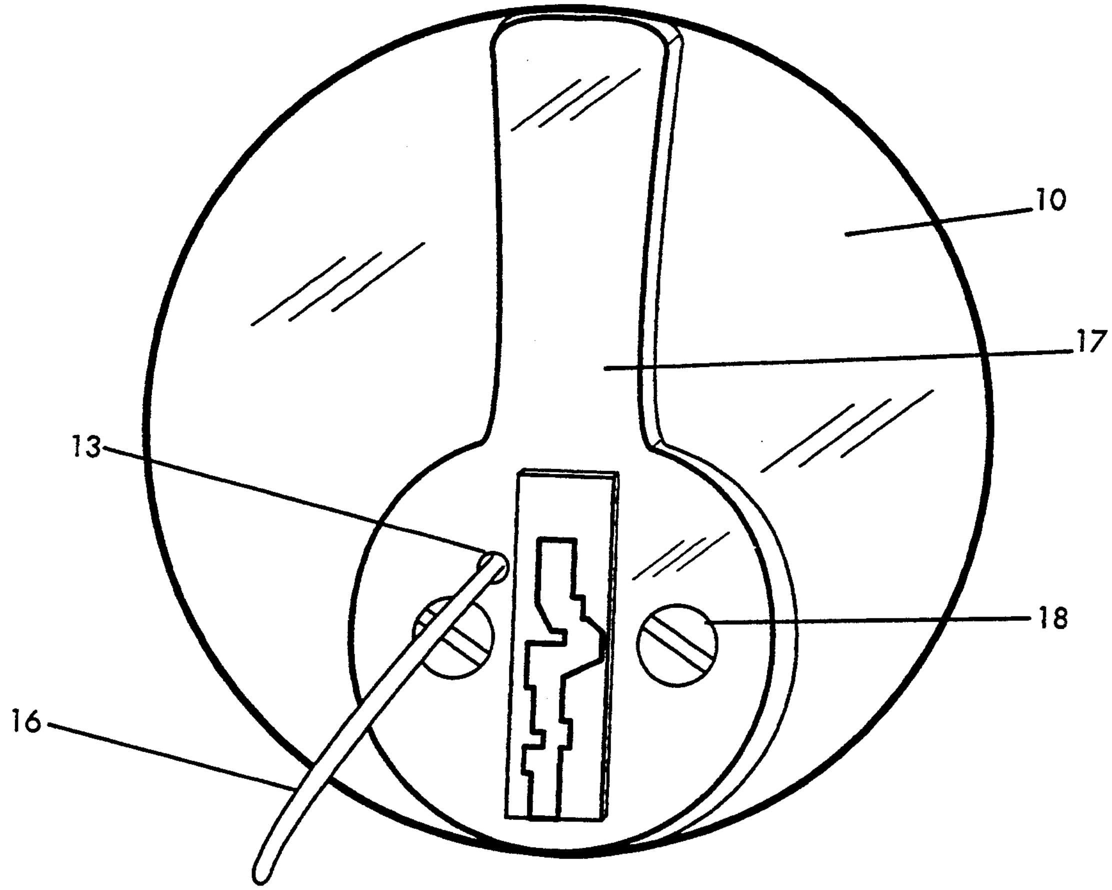
FIG. 3 is a rear view of the same cylinder with the wire ready for connection.

FIG. 3 shows the rear view of the cylinder 10, with the cam/tail piece 17 attached to the cylinder plug by screws 18, and the rear end of the connector hole 12 with the wire end of the connector unit 13. A wire 16 extends from the connector unit.

Figure 4:
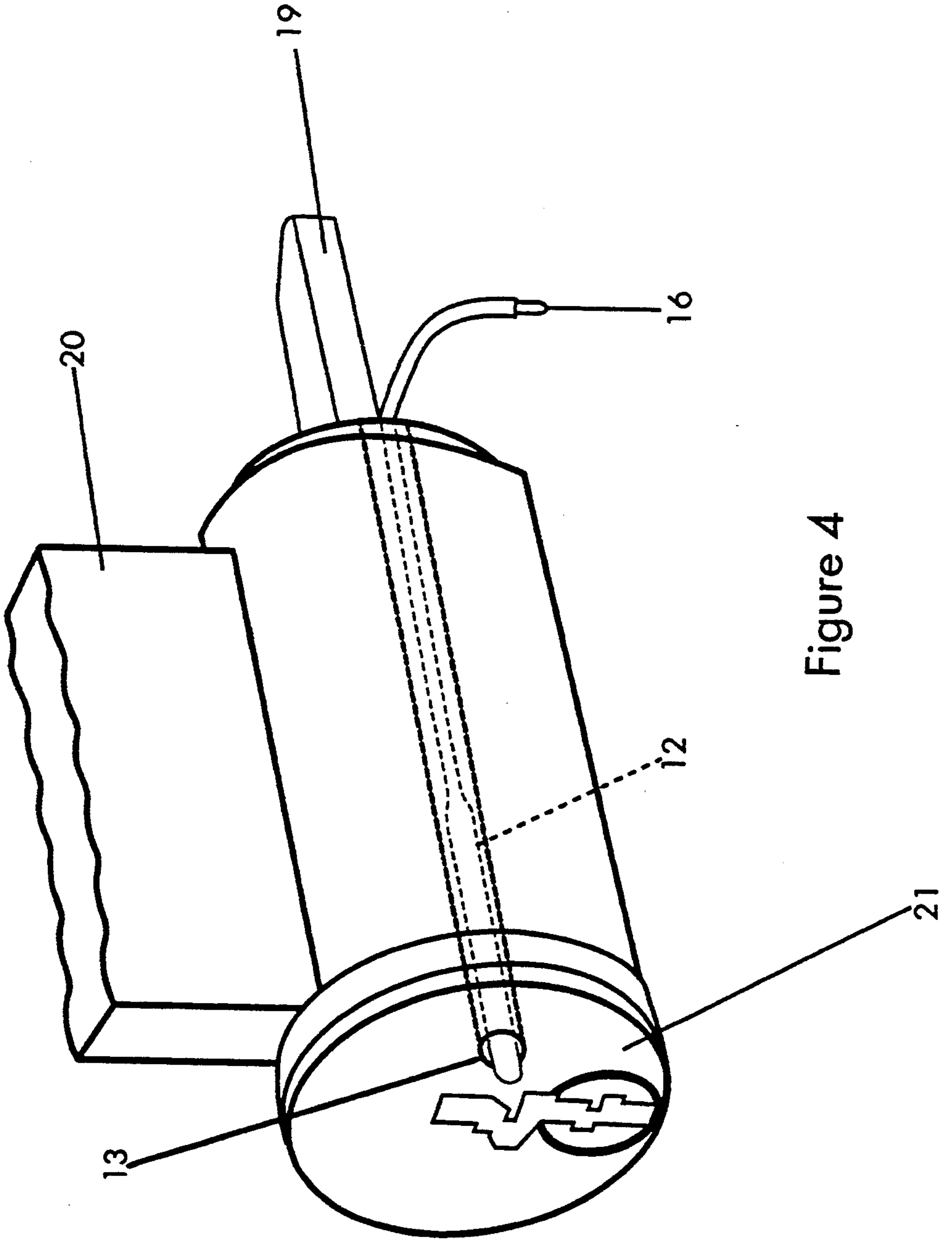
FIG. 4 shows a side view of a mechanical key-in-knob type cylinder fitted with a conversion means.

FIG. 4 shows in perspective a key-in-knob type cylinder equipped with the connector means. The plug 21 inside the cylinder 20 (the pin-holding portion is shown) is equipped with the connector hole 12 and the connector unit 13. The tail/cam piece 19 is attached to the plug 21, with the wire end of connector unit 13 coming out of the rear end of the cylinder 20.

In all types of cylinders, the wire end of the connector unit 13 comes through the plug unit, therefore there is no interference when the cylinder plug turns by use of purely mechanical action. The connector unit turns with the plug, causing no interference to its mechanical operation. Since the plug cannot rotate over one revolution in one direction, the wire 16 cannot be damaged by twisting.

Figure 5:
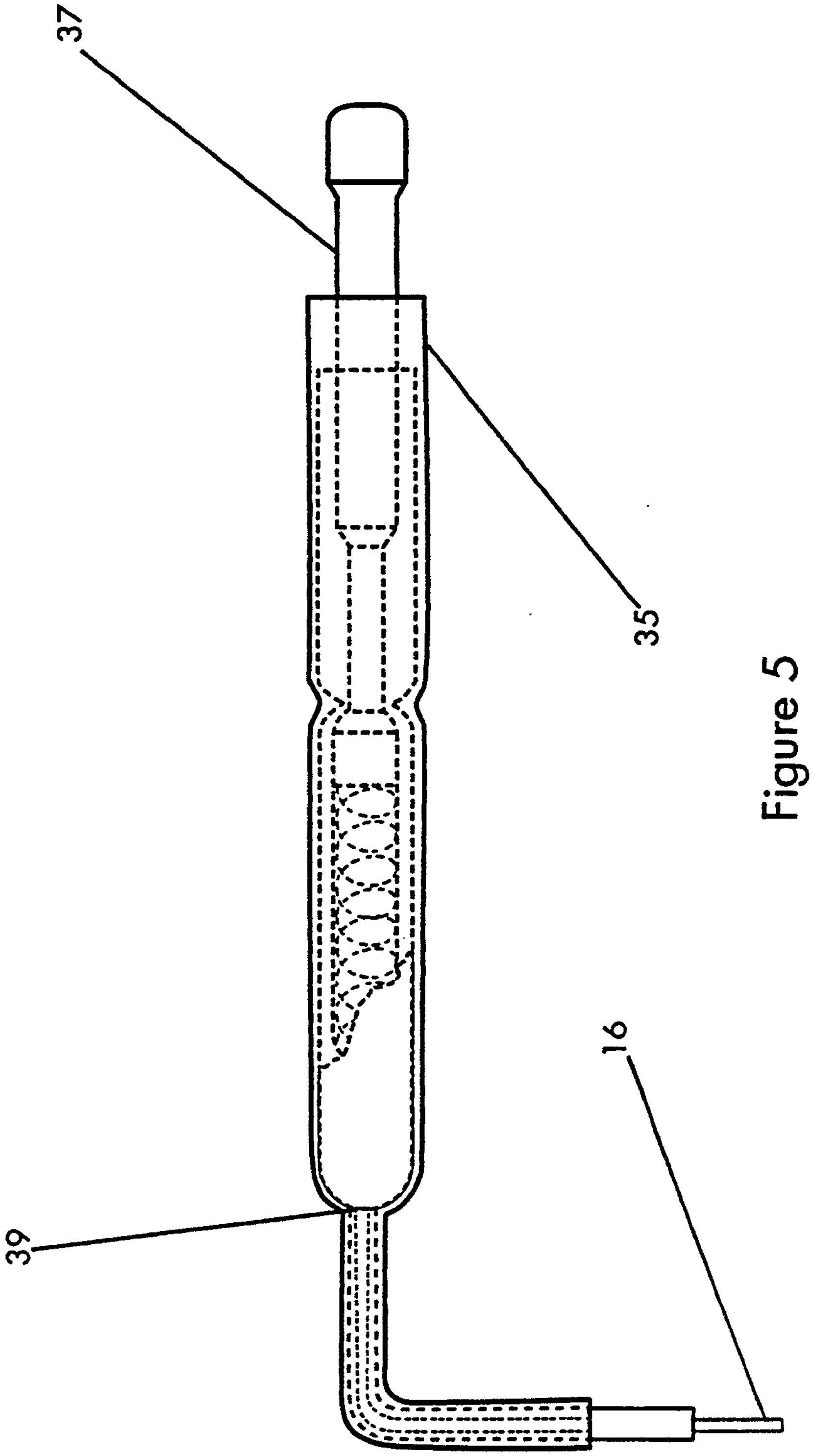
FIG. 5 shows an assembled connector unit. The hole 12 is equipped with the connector unit 13.

FIG. 5 shows the assembled connector unit 13. The spring loaded connector head 37 is soldered to the wire 16 at 39. They are then housed by the insulative heat shrink tube 35. When covered by the heat shrink tube 35 there is sufficient space at the connector head 37 for making contact, i.e. the connector head extends out from the tube 35 and from the plug, when installed.

Figure 6:
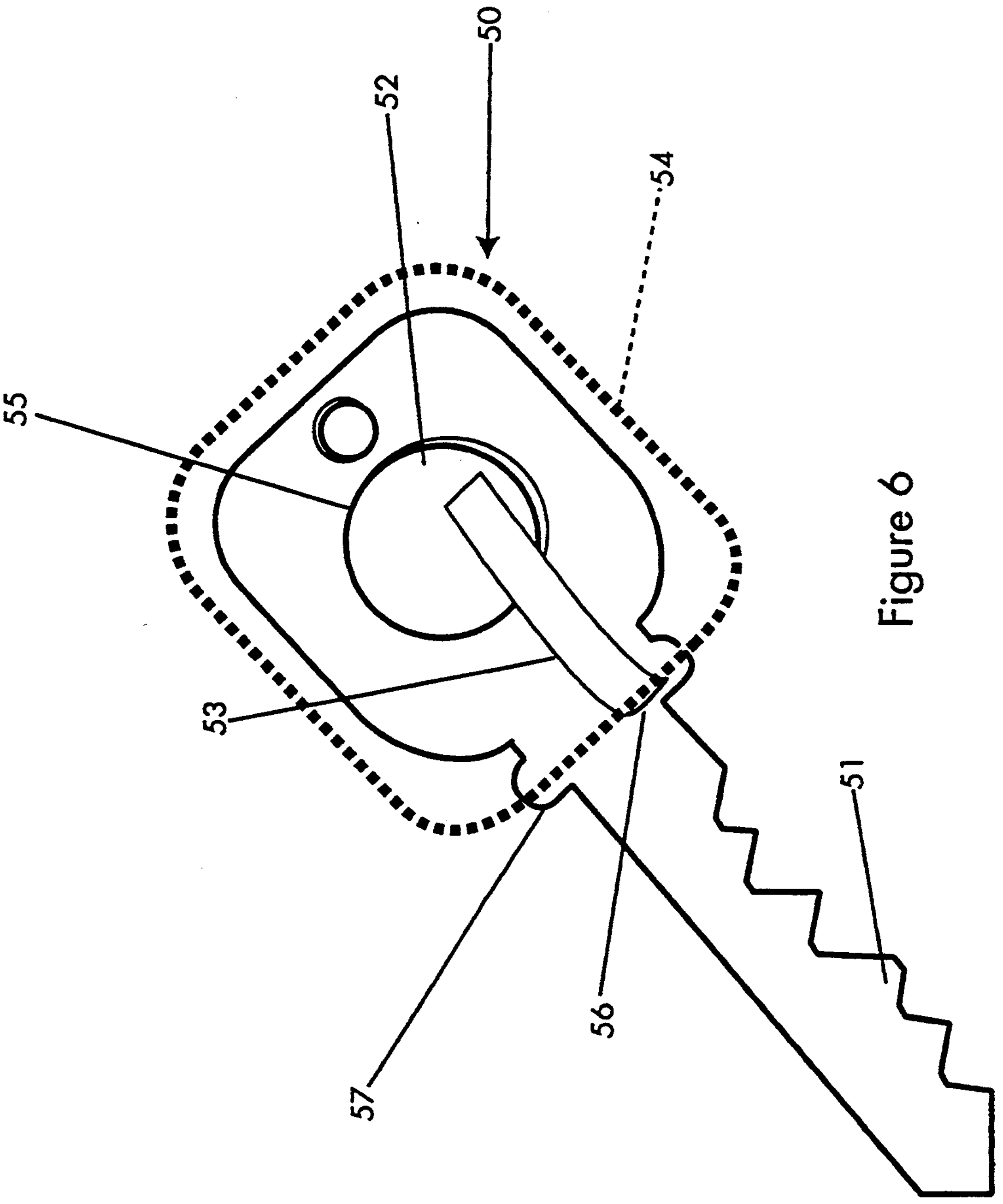
FIG. 6 shows a mechanical key fitted with the memory and contact means.

FIG. 6 shows mechanical key 50 having a mechanical cut configuration 51 fitted with a memory cell 52 into its cavity 55. The outside plastic cover 54, shown in dashed lines, contains the contact probe or contact extension 53 which upon closure of the cover over the key makes contact with the memory cell 52. The other end or tip 56 of the probe 53 is lined up with the shoulder of the key 57. When the key 50 is inserted into the receiving cylinder, the key-probe 53 makes contact with the cylinder connector unit, i.e. with the spring loaded connector head 37.

Instead of being a part of the plastic cover, the contact probe 53 can be permanently secured to the data connection terminal (e.g. by soldering) of the memory cell 52.

Figure 7:
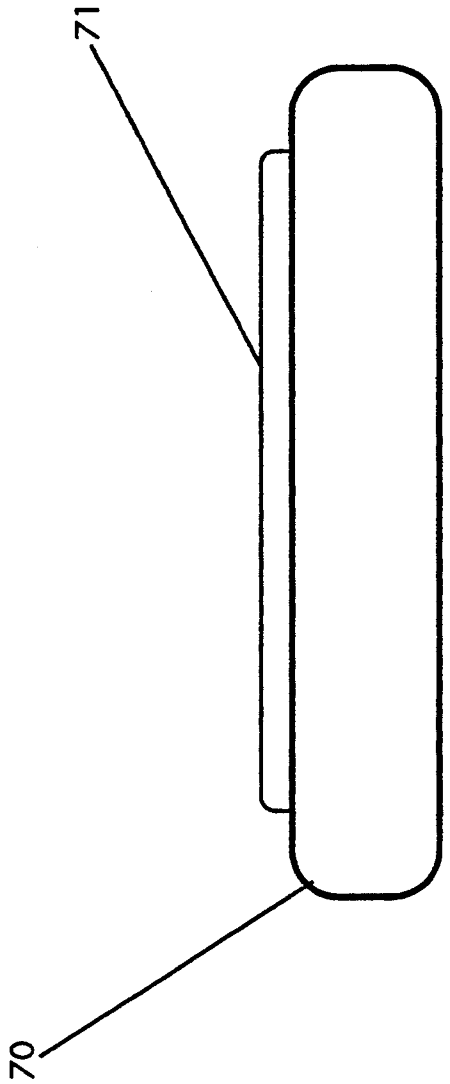
FIG. 7 shows a picture of the memory cell employing one wire bus communication protocol.

FIG. 7 shows the single wire bus type memory cell 52. Item 70 is the ground connection and item 71 is the data connection, the two terminals of the cell. This comprises a single-wire bus communication protocol.

I claim:

1. A conventional mechanical lock cylinder and mechanical key with an electronic access control feature, comprising:

a mechanical lock cylinder having a cylinder plug having a cylindrical outer surface adapted to rotate inside the mechanical lock cylinder, the cylinder plug being of electrically conductive metal and having a key slot and having a generally longitudinal bore closely adjacent to but spaced from the key slot with one end of the bore at an outer surface of the plug, the longitudinal bore extending through the length of the cylinder plug, an electrical connector unit within the bore and having a connector head extending out through the bore at the surface of the cylinder plug, the connector head being electrically insulated from the conductive metal of the cylinder plug and in position to be adjacent to the key when the key is inserted into the key slot, and a conductor wire connected to the connector head, electrically insulated from the metal of the cylinder plug and extending rearwardly in the bore from the plug's outer surface and out of the back of the cylinder plug in a way so as not to interfere with the mechanical function of the cylinder as accessed by the mechanical key, the mechanical key having a head, with a recess formed in the head and a generally flat, low-profile memory cell fitted in the recess so as to substantially maintain the profile of the key head, the memory cell having a pair of electrical contact surfaces, serving as terminals, one terminal being in grounded contact with the metal of the key, and another of said terminals of the memory cell being engaged with a contact extension which is insulated from the metal key and which extends to a position to make contact with the connector head at the outer surface of the cylinder plug when the key is inserted in the key slot, thereby connecting said other electrical contact surface of the memory cell to the conductive wire extending out of the cylinder plug, whereby the memory cell may be accessed electrically when the key is inserted into the key slot of the cylinder plug, the conductor wire and the metal lock cylinder providing two electrical conductors for accessing the memory cell.

2. The apparatus of claim 1, wherein the electrical connector unit includes spring loading means for spring-biasing the connector head to its outwardly extending position, so that when the key is inserted, the contact extension of the memory cell engages and pushes the connector head inwardly in the bore against the spring bias, making secure electrical contact.

3. The apparatus of claim 2, wherein the connector head comprises essentially a cylindrical pin extending out from the bore of the cylinder plug.

4. The apparatus of claim 1, wherein the recess in the key head comprises a through bore passing laterally through the key head, with the memory cell filling the through bore and with outer surfaces of the memory cell not extending appreciably beyond the surfaces of the key head, whereby the user of the key encounters a thickness when gripping the key not substantially greater than the thickness of the key head.

5. The apparatus of claim 1, wherein the mechanical key having the memory cell has a mechanical accessing configuration which is not matched to said lock cylinder with the connector head, but is matched to other lock cylinders not having the electronic access control feature.

6. The apparatus of claim 1, wherein the memory cell holds an identification number known to the intended keyholder, whereby the identification number may be electronically accessed when the key is inserted, and whereby the keyholder can be required to manually enter a matching identification number before access is granted.

7. The apparatus of claim 1, wherein the memory cell holds an encoded biometric template of the intended keyholder, whereby the biometric template may be electronically accessed when the key is inserted, and whereby the keyholder can be required to have a corresponding biometric feature of the keyholder read and matched electronically before access is granted.

8. The apparatus of claim 1, wherein the memory cell is a read/write cell with an internal battery, so that data in the memory cell can be read and/or revised from outside the lock cylinder.

9. The apparatus of claim 8, wherein the memory cell is password protected, whereby only authorized persons can access the data contained in the memory cell.

10. A method for converting a system of conventional mechanical lock cylinders and keys for electronic access control use, comprising the steps of:

in assembled conventional metal mechanical lock cylinders of the system, drilling the cylinder plug of at least some of said lock cylinders to form a small bore adjacent to the keyway of the cylinder plug, and positioning the bore so as not to interfere with the existing mechanical capabilities of the cylinder and an associated mechanical key, inserting into the small bore an electrical contact device and electrically insulating the contact device from the lock cylinder, with the contact device positioned to extend from the bore to a position outside the cylinder, forming a recess in a head of a mechanical key of the system, and inserting a generally flat, low-profile memory cell into the recess so as to substantially maintain the profile of the key head, the memory cell having a pair of electrical contact surfaces, serving as terminals, and including grounding one terminal in contact with the metal of the key, providing a contact probe on another of said terminals of the memory cell and insulating the probe from the metal key, and positioning the probe to extend adjacent to and alongside the key so as to come close to the outer surface of the cylinder plug of the mechanical lock which will receive the key, such that the probe is in position to make contact with the electrical contact device extending from the bore in the cylinder plug, thereby enabling the memory cell on the key to be accessed electrically when the key is inserted into the keyway of the cylinder plug, by engaging of the contact probe of the key with the electrical contact device of the cylinder when the key is inserted into the keyway of the cylinder plug, with the conductor wire and the metal lock cylinder providing two electrical conductors for accessing the memory cells.

* * * * *